June 13, 1939.  D. B. FLICKINGER  2,162,479
VEHICLE SHACKLE
Filed July 14, 1937  3 Sheets-Sheet 3
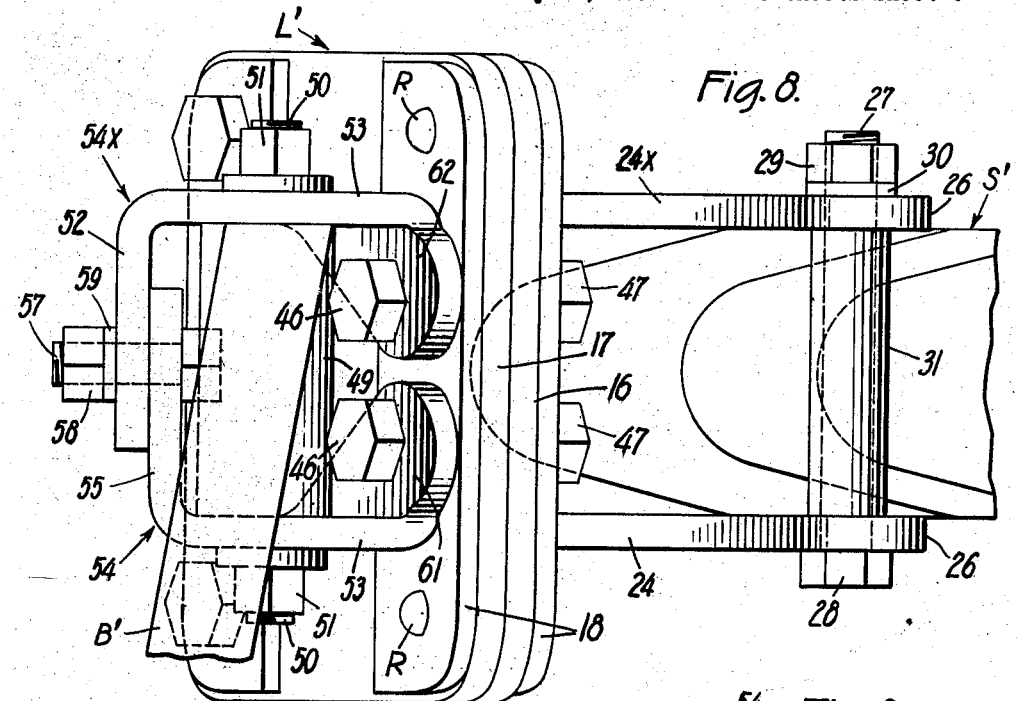
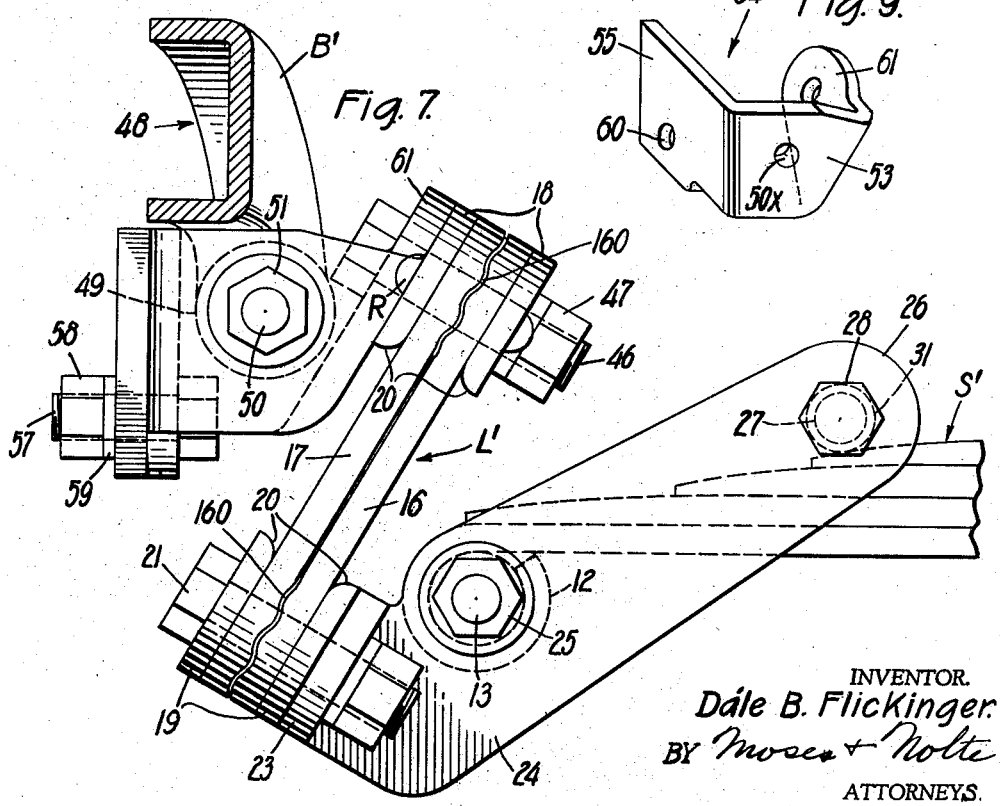
INVENTOR.
Dale B. Flickinger
BY Moses + Nolte
ATTORNEYS.

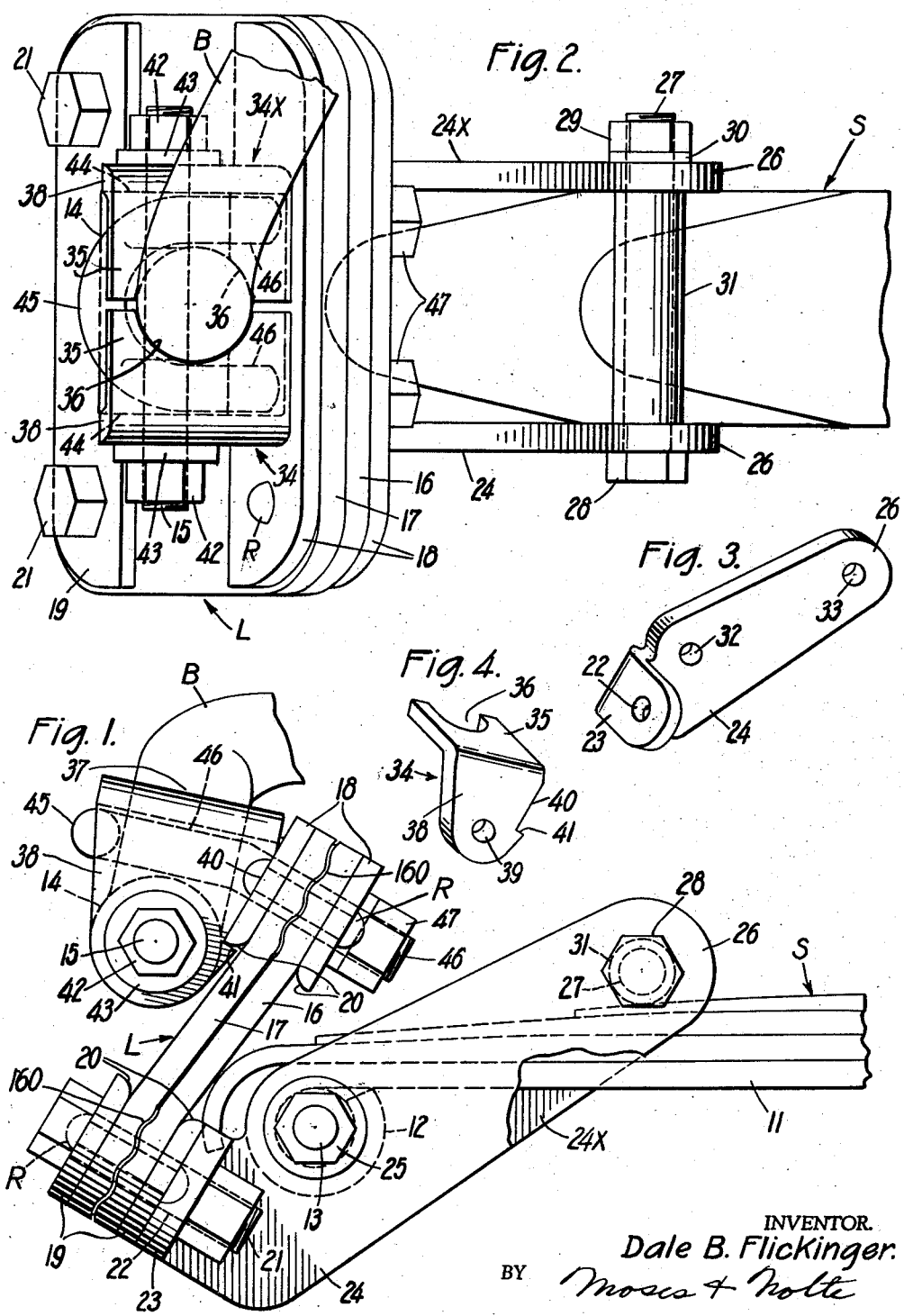

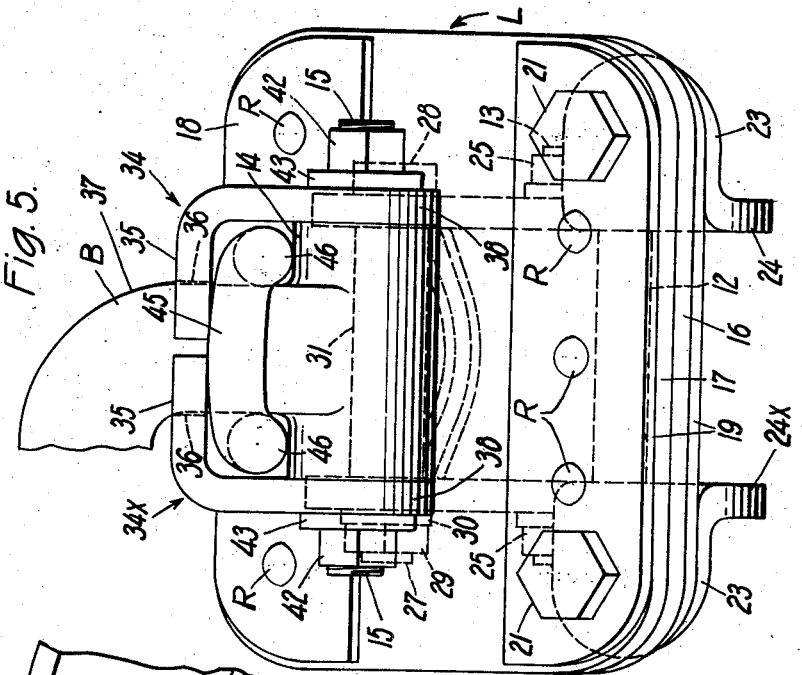

Patented June 13, 1939

2,162,479

UNITED STATES PATENT OFFICE 2,162,479

VEHICLE SHACKLE

Dale B. Flickinger, Toledo, Ohio, assignor to The Belflex Corporation, Toledo, Ohio, a corporation of Delaware Application July 14, 1937, Serial No. 153,466

8 Claims. (Cl. 267—54)

This invention relates to motor vehicles and more particularly to the spring suspensions thereof. It is especially applicable to spring suspensions in which non-metallic shackles are employed, as for example, of the type disclosed in the patents to Bell, Nos. 1,420,680, 1,660,029 and 1,660,030, and is illustrated herein in connection with shackles of this type. It should be particularly observed, however, that the invention is also useful in connection with other types of shackles, as will appear more clearly hereinafter.

An object of the present invention is to provide for securement of the aforesaid flexible-type shackles to vehicle springs, and to other vehicle parts, with an improved sturdiness of structural connection, by the use of fittings so co-ordinated with the supporting and supported parts connected by the shackles as to conform thereto with a desirably solid fit at all contiguous surfaces of the assembled parts.

Another object is to provide a standard set of fittings which can be used in conjunction with flexible-type shackles for the replacement of conventional plate link shackles in motor vehicles of existing models, notably in such replacements when carried out in cars of a type having the features which characterize present Ford models.

A cognate object is to provide such a set of fittings that in the equipment of a vehicle, say of the current Ford model, the set of four replacement shackles of the flexible type can be installed readily with the use of a set of fittings embodying the present invention, and of these fittings the fittings secured to the vehicle springs will be identical in form, including rights and lefts, and the fittings secured to the body will be identical in form, including rights and lefts. Bolts and sleeves by which the replacement structures can be completed, may be of standard form, use being made in large part of the existing eye-bolts, as they are found upon the vehicle to be equipped.

A further object of the invention is to permit the replacement of the old shackles with those embodying the present invention, by the user of the car, with such tools as are customarily at hand, and with the exercise of only such skill as may be expected of persons accustomed to minor adjustments of the parts of a car.

Other objects and features of the present invention will appear as the description of the particular physical embodiment selected to illustrate the present invention progresses.

In the accompanying drawings, like characters of reference have been applied to corresponding parts throughout the several views which make up the drawings, in which:

Fig. 1 is a view in front elevation of an assembly of a flexible shackle and its complemental fittings, in the construction of which the present invention has been embodied; the same being illustrated as applied to connect the left end of a transverse front spring with an adjacent bracket member at the left-hand end of the axle;

Fig. 2 is a plan view of the assembly shown in Fig. 1, only enough of the connected parts being illustrated to afford a clear understanding of the invention, in each view of the drawings;

Fig. 3 is a detail view in perspective of one of the spring fittings, shown separately;

Fig. 4 is a similar detail view in perspective showing separately a fitting adapted to be secured to an axle bracket, as in Figs. 1 and 2;

Fig. 5 is a view in side elevation of a front shackle assembly in the construction of which the present invention has been embodied; this view being taken from left to right of the assembly as shown in Fig. 1;

Fig. 6 is a view in side elevation of a rear shackle assembly in the construction of which the present invention has been embodied; this view being taken from left to right with respect to Fig. 7.

Fig. 7 is a front view of the rear shackle assembly shown in Fig. 6;

Fig. 8 is a plan view of Fig. 7, showing similar to Fig. 2, the assembly of a flexible shackle and its complemental fittings as applied to connect the end of a rear spring with an adjacent member at the left hand side of the body; and Fig. 9 is a detail view in perspective showing separately a fitting adapted to be secured to a rear body member or bracket as in Figs. 7 and 8.

In the now-preferred form of the invention selected for illustration and description, and referring first to Figs. 1, 2 and 5, the part designated generally by the reference character S is part of a transverse front spring of a motor vehicle, comprising several leaf components, of which that designated 11 is provided with an eye 12 of conventional form, transfixed by the eye-bolt 13.

The reference character B designates generally part of a front axle member of a motor vehicle, (not shown) of which bar 14 designates an elongated eye of cylindrical form, and 15 designates a bolt which, with the bolt 13 furnishes the usual means for attachment of the ends of a plate shackle link (not shown), in replacement of which the present invention provides for the insertion of a flexible shackle designated generally by the reference character L, to be attached by fittings which will now be described.

This shackle is of the inextensible, flexible tension type disclosed in the patents to Bell to which reference has already been made, and in the present instance comprises a double ply of stiff, somewhat flexible fabric 16 and 17 clamped between cross-bar members 18 at one edge and between similar members 19 at the opposite edge, these members having rounded faces 20 for the known purpose of avoiding abrasion of the flexible plies, and of decreasing the bending stress as the flexible shackle is laterally displaced in known fashion.

In pursuance of the present invention the lower edge of the shackle is transfixed by a bolt 21 which passes through the orifice 22, (see Fig. 3) in a lug 23 offset from the body plane of a plate link 24 which is transfixed by the eye-bolt 13 of the spring to which reference has already been made.

It will be understood that a shackle plate link 24x is disposed at the other side of the spring S, and is also transfixed by the bolt 13, the two plates being held in firmly embracing relation with the ends of the spring eye 12 by nuts 25 screwed upon the ends of the eye-bolt, the shackle being secured to the plate 24x by another bolt 21.

In further pursuance of the invention, the free ends 26 of both of these bracket plates are extended rearwardly and upwardly as illustrated best in Fig. 1 and are connected (see Fig. 2) by another bolt 27 having at one end a head 28 having at its other end a nut 29, with a lock washer 30 which tends to hold the plate links 24 and 24x against the sides of the spring S, while a sleeve 31 serves as a spanning piece to prevent undue strain upon the springs which might interfere with their proper resilience.

It is intended that the attachment assembly shown in Figs. 1–5 for the front spring of a motor vehicle, as for example a current model of Ford car, shall be sold as part of a set for equipment of the entire car, and this particular front spring assembly may comprise the right and left bracket plates 24 and 24x, together with the bolt 27, sleeve 31, nut 29 and washer 30, it being understood that the eye-bolt 15 and the eye-bolt 13, with its nut 25, are usually found upon a car in position to hold the conventional plate shackle link which is to be discarded upon replacement by the structure being described.

One of the bracket plates, as 24, is illustrated in detail separately on a reduced scale in Fig. 3, in which its structural form is shown so clearly that it is unnecessary to describe it in detail. Fig. 3 shows clearly the orifices 32 and 33 through which the bolts 13 and 27 respectively are extended in the manner already described.

The preferred form of means for attaching the upper end of the shackle L to the elongated eye 14, (see Fig. 5) at the end of the axle bar B will now be described, as follows:

In Fig. 4 is shown in perspective, on a smaller scale, one of a pair of angle pieces 34 and 34x, these pieces being symmetrical with each other, and each having in one arm, as 35, a notch 36 suitably shaped to fit around the axle bar B at the region 37 (see Figs. 2 and 5). The other arm of each angle piece, as 38, is provided with an orifice 39 and has one edge notched as at 40, to form a shoulder 41, the orifice 39 in each of the angle pieces being transfixed by the eye-bolt 15, the latter having the conventional nuts 42 and lock washers 43 by which the members 34 may be clamped tightly against the ends 44 of the elongated eye 14 at the end of the axle bar B.

The actual attachment of the upper end of the flexible shackle link L is preferably effected by means of a U-bolt 45, the shanks 46 of which straddle the portion 37 of the axle bar B, and these shanks are confined under the opposed overlying arms 35 of the angle pieces 34 respectively. It will be noticed that the adjacent edges of these overlying arms of the angle piece do not quite meet, so that the other arms 38 of the angle piece can be forced into firm engagement with the shanks 46 of the U-bolt as indicated in Fig. 2, thus binding the bolt firmly between the arms 38 and the upright portion 37 of the axle bar B. This is accomplished simply by tightening up the nuts 42 upon the eye-bolt 15 in known fashion, an operation which is familiar to every user of a car and does not require any tools other than a wrench or key such as commonly found in the tool kit of every car.

Furthermore, the U-bolt loop 45 (see Fig. 1) and the plates 38 at the upper edge of the flexible shackle can be drawn together by simply tightening the nut 47 at the end of each shank 46. This tightening operation clamps the rear cross bar 18 against the bevelled shoulder 40 of the angle arm 38, and the tendency to set the nose 20 of the cross bar against the shoulder 41 of the arm 38 is naturally accentuated by the inclined surface 40 of the part 38.

From the foregoing it will be seen that the attachment device for the upper end of the flexible shackle comprises simply a right and left angle piece 34, 34x, and a U-bolt 45 with its nuts 47, and it is intended that such an assembly shall be supplied as part of the set which includes the assembly already described for securing the lower end of the shackle to the spring eye 12.

It will also be understood that the foregoing description of the flexible shackle attachment at the front end of the car at one side applies structurally to a similar spring shackle attachment at the left side of the car in the front, so that no further description of the structure at the other side need be added. These assemblies are identical in the structure of their component parts.

Passing now to the shackles for the right and left sides, at the rear of the car, only that for one side need be illustrated and described, and such illustration will be found in Figs. 6 to 9 inclusive of the drawings, where the rear right shackle is illustrated.

The spring structure is designated generally in these figures by the reference character S', but otherwise such details as correspond in construction with those already described will be indicated by like reference characters, including the spring eye 12, eye-bolt 13 and nut 25, the bracket plates 24 and 24x, the bolt 27, with its nut 29, lock washer 30 and sleeve 31; the offset lug 23 and bolt 21 by which the plate link 24 is clamped to the lower edge of the flexible link L'; all these are as already described, and so also are other parts bearing corresponding reference characters like heretofore described parts. The supporting axle member in the case of the rear shackles is of somewhat different form, as shown at B' in the figures now under description tion, this being a member of generally channeled structure as indicated at 48 (see Fig. 7) and this member is curved downwardly and merged in the structure of an eye 49 at the end of the axle member B', through which eye extends an eye bolt 50 secured in place by nuts 51 which serve to tighten the bolt just mentioned.

In pursuance of the present invention, yokes 54 and 54x are provided one at each end of the elongated eye 49, the plate portion 53 of each yoke being disposed in contact with an end of the eye, it being understood that the eye yokes 54 and 54x are suitably symmetrical except for the fact that as shown most clearly in Fig. 8 the plate portion 52 of the yoke 54x is of such length to overlap the portion 55 of the yoke 54. Accordingly, both of these overlapping arms may be and are, preferably, transfixed and held in place by a single bolt 57 with nut 58 and lock washer 59. The bolt transfixes an orifice 60 in each of the overlapping yoke plates 52, 55. Similarly, the plate 53 is provided with an orifice 50x which is transfixed by the eye-bolt 50.

The yoke 54 has, opposite the arm 52 or 55 as the case may be, an arm 61 upon the yoke 54, and an arm 62 upon the yoke 54x, each of these arms 61 and 62 being formed at a suitable angle to the opposite plate 52 or 55 to cause the inclined arms to effect a desirable inclination in the contiguous cross bars 18 between which the upper edge of the flexible shackle L' is clamped.

This is shown clearly in Figs. 7 and 8, which illustrate also the bolts 46 by which the clamping is effected.

From the foregoing, it will be understood that in the case of the rear spring shackles, each assembly at one side of the car comprises two symmetrical bracket plates, 24 and 24x symmetrically disposed as described with reference to the bracket plates bearing similar references characterized in the assemblies at the front of the car; and each assembly at the rear comprises two of the yokes, 54 and 54x respectively, each side of the rear yokes being of identical formation, for a right or left side of the car so that no effort is necessary to insure proper disposition at either side, and accordingly the installation of the last named assembly can be effected accurately by anyone with a wrench and a certain amount of experience.

It will be understood that any suitable form of flexible shackle may be used in place of those designated L and L', the form illustrated being advantageous for such use, however, in the respect that it may be readily removed and a new shackle of like construction substituted at any time, as it constitutes a complete entity, saleable as such. The reference characters R designate rivets by which the cross-pieces 18, 19 and flexible components 16 and 17 with their corrugated sheet metal reinforcements 160, are secured together permanently to form a sturdy unitary shackle device.

I have described what I believe to be the best embodiments of my invention. I do not wish, however, to be confined to the embodiments shown, but what I desire to cover by Letters Patent is set forth in the appended claims.

I claim:

1. In a vehicle, the combination with an axle, provided with a supporting bar having an elongated eye transfixed by an eye-bolt; of a spring having leaf components and provided with an eye and an eye-bolt; an inextensible flexible tension shackle; a U-bolt attaching said shackle to said axle bar; clamping members impaled upon the first-mentioned eye-bolt in clamping relation to the axle bar and to the U-bolt and means to attach said shackle to the spring, comprising a pair of bracket-plates each having a body orifice transfixed by said eye-bolt of the spring, and each having an offset lug bolted to said flexible shackle, said pair of plates being assembled in opposed position, one at each side of the end portion of the spring, and a bolt extending between the free ends of said bracket plates, connecting them above the spring leaves; the bracket plates being firmly held by said last named bolt and the eye-bolt of the spring in embracing contact with the sides of the spring.

2. In a vehicle, the combination with an axle, provided with a supporting bar having an elongated eye transfixed by an eye-bolt; of a spring having leaf components and provided with an eye and an eye-bolt; an inextensible flexible tension shackle; means including the second mentioned eye-bolt to attach said shackle to said spring; and a U-bolt attaching said shackle to said axle bar; said shackle-attachment means for the axle comprising a pair of angle-bracket fittings each having one angle-arm notched to fit around the axle bar; said angle brackets having their other angle arms assembled in opposed positions confining said U-bolt, and each of the last-named arms being provided with an orifice transfixed by the first-named eye-bolt; and said angle brackets embracing, in their angles, the shanks of said U-bolt, and confining said shanks against said elongated eye.

3. In a vehicle, the combination with an axle, provided with a supporting bar having an elongated eye transfixed by an eye-bolt; of a spring having leaf components and provided with an eye and an eye-bolt; an inextensible, flexible tension shackle; a U-bolt attaching said shackle to said axle bar; and means to attach said shackle to said spring, comprising a pair of bracket-plates each having a body orifice transfixed by said eye-bolt of the spring, and each having an offset lug bolted to said flexible shackle; said pair of plates being assembled in opposed position one at each side of the end portion of the spring, and a bolt extending between the free ends of said bracket plates, connecting them together above the spring leaves and holding them in proper alignment with each other; and shackle-attachment means for the axle comprising a pair of angle bracket fittings each having one angle-arm notched to fit around the axle bar, said angle brackets having their other angle arms provided with an orifice transfixed by the first-named eye-bolt, and said angle brackets embracing, in parallelism with their notched portions, the shanks of said U-bolt, and confining said shanks against said elongated eye at the end of said axle bar.

4. In a vehicle having an axle bar, with an elongated eye and an eye-bolt; a flexible shackle attachment means comprising a U-bolt fitted around said bar and having a pair of shanks transfixing said flexible shackle; angle-bracket fittings each having one angle-arm notched to fit around said axle bar, and other angle arms assembled in opposed positions confining said U-bolt, each of the last-named arms being provided with an orifice transfixed by the first-named eye-bolt, and said angle brackets embracing, in their angles, the shanks of said U-bolt, confining said shanks against said elongated eye, and nuts upon said U-bolt shanks for tightening the parts so assembled.

5. In a vehicle having an axle bar, with an elongated eye and an eye-bolt; a flexible shackle attachment means comprising a U-bolt fitted around said bar and having a pair of shanks transfixing said flexible shackle; angle-bracket fittings each having one angle-arm notched to fit around said axle bar, and other angle arms assembled in opposed positions confining said U-bolt, each of the last-named arms being provided with an orifice transfixed by the first-named eye-bolt, and said angle brackets embracing, in their angles the shanks of said U-bolt, confining said shanks against said elongated eye, and nuts upon said U-bolt shanks for tightening the parts so assembled, said last-named angle arms having each a bevelled edge and an adjoining shoulder presented toward said flexible shackle; and the shackle having a cross-bar seated against said shoulders and bevelled face; said U-bolts being bent at an angle perpendicular to said shoulder and to the cross bar of said shackle seated thereagainst, and transfixing said cross-bar, whereby said angle arms, said U-bolt, said axle bar and its elongated eye, and said cross shackle bars, are respectively drawn into an interlocking, compacted formation, free from rattling and substantially wear-free, when the aforesaid bolts are respectively tightened.

6. As a new article of manufacture: an attachment device for securing an inextensible flexible tension shackle of the class described to an eye-member at the end of an axle bar of a motor vehicle; said device comprising a pair of angle-bracket fittings each having one arm notched to fit around said axle bar; said angle brackets having each an orifice in its other arm and a U-bolt having shanks adapted to transfix said flexible shackle and provided with nuts to tighten the U-bolt in place, said angle brackets being adapted for assembly with the shanks of said U-bolt straddling said axle bar with the notched arms of said angle pieces fitted to the bar and the apertured arms of the angle-pieces embracing the shanks of the U-bolt and disposed in registry with, and transfixed by, a bolt seated in said eye of the axle bar.

7. An attachment device for securing an inextensible flexible tension shackle of the class described to an axle bar of a vehicle, said device having the features claimed in claim 6 in which each of said last-named angle bracket arms has a bevelled edge and an adjoining shoulder adapted to be presented toward said flexible shackle, and the shackle has a cross bar seated against said bevelled face and shoulder.

8. An attachment device for securing an inextensible flexible tension member of the class described to an axle bar of a vehicle, said device having the features claimed in claim 6 in which each of said last-named angle bar arms has a bevelled edge and an adjoining shoulder adapted to be presented toward said flexible shackle and the shackle has a cross bar seated against said bevelled face and shoulder, said U-bolt shanks being bent at an angle perpendicular to said beveled edge and to the cross bar of said shackle seated thereagainst, whereby said angle arms, said U-bolt, said axle bar and its elongated eye, and said cross shackle bars, are respectively adapted to be drawn into an interlocking, compacted formation, free from rattling and substantially wear-free, when the eyebolt and U-bolt are respectively tightened; said parts constituting a complete unitary attachment structure for replacement of a conventional planiform shackle link.

DALE B. FLICKINGER.

CERTIFICATE OF CORRECTION.

Patent No. 2,162,479.                     June 13, 1939.

DALE B. FLICKINGER.

It is hereby certified that error appears in the printed specification of the above numbered patent requiring correction as follows: Page 3, second column, lines 63 and 64, and page 4, first column, lines 4 and 5, claims 4 and 5 respectively, for the words "shackle attachment" read shackle; shackle attachment; page 4, first column, line 22, claim 5, for "U-bolts" read U-bolt shanks; and that the said Letters Patent should be read with this correction therein that the same may conform to the record of the case in the Patent Office.

Signed and sealed this 8th day of August, A. D. 1939.

Leslie Frazer,
(Seal)                              Acting Commissioner of Patents.